March 17, 1942.  R. A. PETERSON  2,276,335

METHOD OF MAKING WEATHERING CORRECTIONS

Filed July 24, 1939

INVENTOR.
RAYMOND A. PETERSON
BY
Lippincott & Metcalf
ATTORNEYS.

Patented Mar. 17, 1942

2,276,335

UNITED STATES PATENT OFFICE 2,276,335

METHOD OF MAKING WEATHERING CORRECTIONS

Raymond A. Peterson, Altadena, Calif., assignor, by mesne assignments, to Consolidated Engineering Corporation, Pasadena, Calif., a corporation of California Application July 24, 1939, Serial No. 286,179

4 Claims. (Cl. 181—0.5)

My invention pertains to seismic prospecting and in particular to a method for obtaining necessary information regarding the depth of the weathered layer of the earth, the time required for waves to travel vertically through the weathered layer and the wave velocity in the earth just beneath the weathered layer.

In conducting seismic exploration, waves are ordinarily received simultaneously at a plurality of receptors spaced on the surface of the earth. Due to various causes, the time of travel required for a wave to pass through the low speed surface layer, commonly known as the "weathered layer," varies from one receptor to another. Numerous techniques have been developed for determining the difference in time required for waves to travel through the weathered layer at various receptor stations. Where accurate dip determinations are necessary, the weathering correction techniques heretofore used are not satisfactory because they fail to take into account the depth of the weathered layer as well as the wave travel time through the layer.

My invention overcomes the objections to prior weathering correction techniques by determining the thickness of the weathered layer, at any desired point as well as the time of travel therethrough.

The principal object of my invention is to provide a method for determining the depth to a high velocity geologic layer beneath the surface of the earth.

Another object of my invention is to determine vertical travel times in the weathered layer.

Another object is to provide a method for determining the velocity in the weathered layer.

Still another object is to provide a method for determining velocity in the high speed layer beneath the weathered layer.

Another object is to provide a method for determining the depth of the weathered layer at a plurality of horizontally spaced shot points to enable the selection of optimum shooting depths at the respective shot points.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus, of the present application, as I may adopt various other apparatus embodiments, utilizing the method, within the scope of the appended claims.

Referring to the drawing.

In general terms, my invention comprises establishing a vertical series of receptors in a drill hole at known depths, including a point somewhat deeper than the bottom of the weathered layer; establishing a shot point at a known distance spaced horizontally from the receptors; detonating an explosive at said shot point; and measuring the relative time of arrival of waves received at said receptors. From the data obtained I am able to determine the travel time through the weathered layer, the depth of the weathered layer, the velocity in the high speed layer below the weathered layer, and the velocity in the weathered layer.

Figure 1:
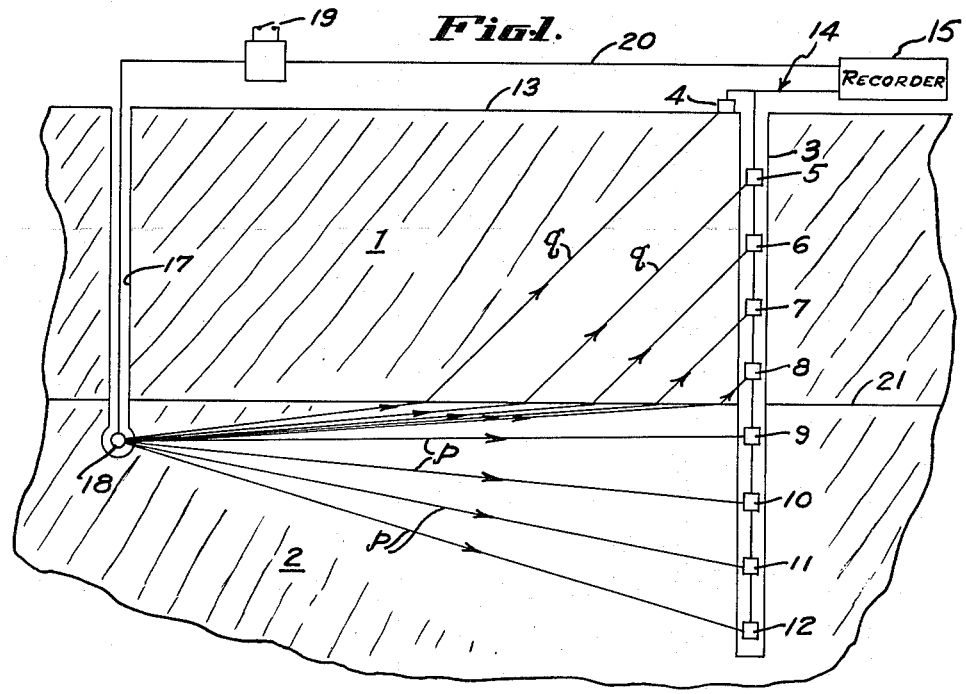
Fig. 1 is a sectional view of a part of the earth to which my invention may be applied.

Referring to Fig. 1 for an example of an application of my method, I drill a substantially vertical hole 3 in the weathered layer 1 of the earth to such a depth that the hole penetrates the sub-weathered layer 2. Into the drill hole 3, I lower a string of receptors 5 to 12 inclusive, preferably spaced at uniform intervals and at known depths below the earth surface 13. Preferably the uppermost receptor 4 is placed on the earth surface 13. Receptors 5 to 12 are attached to a multiconductor cable 14 which connects the receptors to separate recording elements of a recorder 15.

All the seismometers are coupled acoustically to the ground to provide for the detection of seismic waves. Such acoustic coupling may be provided by filling the bore hole with water or mud, or by making mechanical contact between the seismometers and the walls of the bore hole.

At a known distance from drill role 3, I place a source of seismic waves 18, preferably a charge of explosive in the drill hole 17, the detonator of said explosive being connected through the firing key 19 and cable 20 to a recording element in the recorder 15. Charge 18 is preferably placed a short distance beneath the bottom 21 of the weathered layer 1, but under some conditions may be placed within the weathered layer 1 or even at the surface, as will readily occur to those skilled in the art. Upon closing the firing key 19, the explosive charge 18 is detonated and seismic disturbances propagated therefrom in all directions.

The instant of detonation is registered by a recording element of recorder 15. Some of the waves $p$ generated by source 18 travel directly to those receptors 9, 10, 11, and 12 which lie in the high velocity layer 2. Other waves $q$ reach receptors 4, 5, 6, 7, and 8 after refraction at the bottom of the weathered layer.

Those waves $p$ which travel directly to receptors 8, 9, 10, 11, and 12 arrive at said receptors substantially simultaneously.

The waves $q$ which travel to the receptors 4, 5, 6, 7 and 8 require greater travel times depending on the heights of the receptors above the bottom of the weathered layer.

When the waves are received by the various receptors 4 to 12, indications of the arrival times are produced on a record within the recorder 15.

Figure 2:
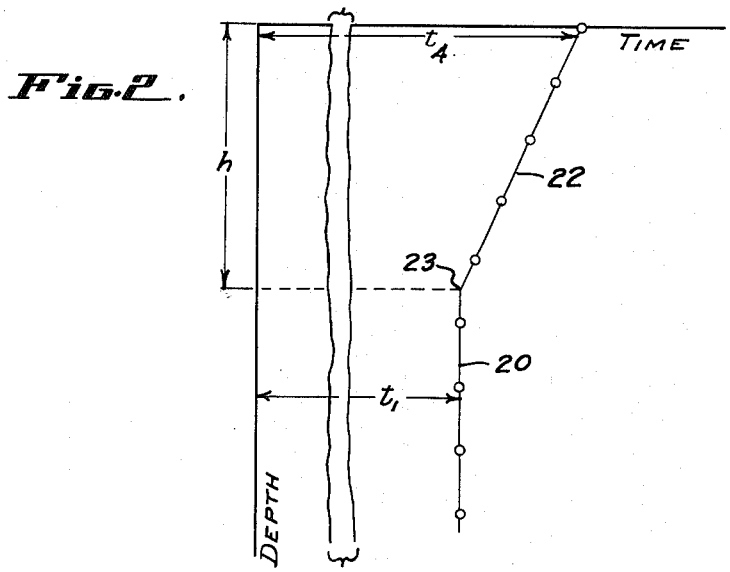
Fig. 2 is a time-depth graph obtained in accordance with the method of my invention.

This record is then examined to determine the times of arrival of waves $p$ and $q$ at the various receptors 4 to 12. I plot the times of arrival as ordinates, against receptor depths as abscissae, in a graph such as shown in Fig. 2. The times of arrival at receptors 9 to 12 fall upon a substantially vertical line 20 and the times of arrival at the receptors 4 to 8 which lie above the interface 21 fall upon a sloping line 22. The depth $h$ corresponding to the intersection 23 of lines 20 and 22 is the depth of the interface 21.

From the time $t_1$ required for the waves to reach the receptors beneath the weathered layer, and the horizontal distance $d$ from the shot hole 16 to the receptor hole 3 I am able to compute the wave velocity $V_2$ in the high speed layer 2.

This velocity is given by:

$$v_2 = \frac{d}{t_1} \text{ (approximately)} \quad (1)$$

The time $t_0$ required for a wave to travel vertically through the weathered layer is given by:

$$t_0 = (t_4 - t_1)\left(1 + \frac{1}{2}\frac{v_1^2}{v_2^2}\right) \text{ (approximately)} \quad (2)$$

where
$t_4$ = time for wave to travel from shot 18 to receptor 4 at the top of the weathered layer.
$v_1$ = wave velocity in the weathered layer.

The value of $v_1$ used in Equation 2 need not be exact as it enters into the equation in the form of a small correction. In case the value of $v_1$ is unknown, a reasonable value may be assumed to compute $t_0$, and then another value of $v_1$ may be found from $t_0$ and the thickness of the weathered layer. In case the new value obtained differs widely from the value assumed, a more accurate value may be obtained by known methods of successive approximation.

From a knowledge of the depth of the weathered layer, the time required for waves to travel therethrough, and the wave velocity in the high velocity layer beneath the weathered layer I am able to make more accurate determinations of subsurface structural relief than are otherwise possible.

In case knowledge of the subweathered layer velocity $V_2$ is not desired no record need be made of the shot instant and the shot need not be placed beneath the weathered layer.

In addition to the foregoing advantage a knowledge of the weathered layer thickness makes possible the placement of shots at standard depths below the bottom of the weathered layer and thereby enables me to generate seismic waves of substantially uniform or optimum character at successive shot points along a line of exploration.

Figure 3:
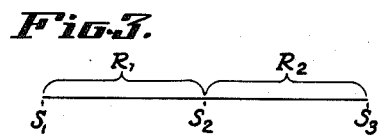
Fig. 3 is a plan view of a sequence of shot holes and receptor spreads used in exploration.

In Fig. 3, I have shown a plan view of a succession of setups to which my invention may be applied. Here $S_1$, $S_2$, and $S_3$ represent shot hole positions and $R_1$ and $R_2$ represent lines along which spreads of receptors are laid out. According to my invention I determine the thickness of the weathered layer at successive horizontally spaced shot points by the new method hereinabove described. Using one of the receptor spreads, say $R_1$ and one of the shot points $S_2$, I produce a succession of records from waves generated at various depths below the bottom of the weathered layer. By comparison of these records I select a shooting depth suitable for the production of a legible exploration record. Then in making other exploration records in the same area I shoot at the same depth below the bottom of the weathered layer.

While I have discussed the application of my invention to only one simple case, those skilled in the art will readily perceive that it is applicable to more complex conditions and they will be able to modify the methods of calculation in accordance with my teachings above.

It will also be clear to those skilled in the art that my invention may be applied to more complex structures than that illustrated in the foregoing description.

Thus it is seen that my invention provides a method for making an accurate determination of the depth of the weathered layer or the depth to any high velocity interface below the surface of the earth, to the end that such weathering determination may greatly increase the accuracy of following exploration records.

I claim:

1. In the method of locating the bottom of a weathered layer having a relatively low seismic wave velocity and overlying a contiguous subweathered layer having a relatively high seismic wave velocity, the improvement which comprises generating a set of seismic waves which travels in the subweathered layer and substantially parallel to the interface separating the layers, some of which waves are refracted at the interface into the weathered layer at substantially the critical angle, receiving at a line of collinear points within the layers and at known depths both the refracted waves and waves which have traveled in the subweathered layer without refraction, and measuring the relative times of arrival of the waves at the respective reception points to locate the interface between said layers.

2. In the method of locating the bottom of a weathered layer having a relatively low seismic wave velocity and overlying a contiguous subweathered layer having a relatively high seismic wave velocity, the improvement which comprises generating a set of seismic waves which travels in the subweathered layer and substantially parallel to the interface separating the layers, some of which waves are refracted at the interface into the weathered layer at substantially the critical angle, receiving the refracted waves at a series of collinear points in the weathered layer and the waves which have not been refracted in a second series of points in the subweathered layer and collinear with the first series of points, and measuring the relative times of arrival of the waves at the respective points to locate the interface between said layers.

3. A method according to claim 2, in which a refracted wave is received at the surface of the earth at a point which is substantially collinear with the other reception points.

4. In the method of locating an interface between two contiguous layers, one having a relatively high characteristic seismic wave velocity, and the other having a relatively low characteristic seismic wave velocity, the improvement which comprises generating one set of waves which travel substantially parallel to the interface in the high velocity medium, simultaneously generating a second set of waves each of which travels a distance in the high velocity medium along a path which is substantially parallel to the interface and is then refracted at the interface into the low velocity medium at substantially the critical angle, receiving both sets of waves at series of spaced points in the layers at known depths beneath the surface on a line which is substantially normal to the interface and which intersects the interface between end reception points on the line, and measuring the relative times of arrival of the waves at the respective reception points to locate said interface.

RAYMOND A. PETERSON.